United States Patent
Kumar et al.

(10) Patent No.: US 11,062,536 B2
(45) Date of Patent: Jul. 13, 2021

(54) METHOD AND APPARATUS FOR STATISTICAL VEHICLE ELEMENT FAILURE ANALYSIS

(71) Applicant: FORD GLOBAL TECHNOLOGIES, LLC, Dearborn, MI (US)

(72) Inventors: Pankaj Kumar, Dearborn, MI (US); Imad Hassan Makki, Dearborn Heights, MI (US); Fakhreddine Landolsi, Canton, MI (US); Hassene Jammoussi, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 804 days.

(21) Appl. No.: 15/437,596

(22) Filed: Feb. 21, 2017

(65) Prior Publication Data
US 2018/0240290 A1   Aug. 23, 2018

(51) Int. Cl.
G07C 5/08 (2006.01)
G01C 21/00 (2006.01)
G05B 23/02 (2006.01)
G07C 5/00 (2006.01)
G06Q 10/00 (2012.01)

(52) U.S. Cl.
CPC .......... *G07C 5/0841* (2013.01); *G06Q 10/20* (2013.01); *G07C 5/008* (2013.01); *G07C 5/0808* (2013.01)

(58) Field of Classification Search
CPC ... G07C 5/08; G08G 1/09; G08G 1/01; G01C 21/00; G06Q 30/00; G06F 19/00; B60K 6/48; G01M 17/007; G05B 23/02
See application file for complete search history.

(56) References Cited

U.S. PATENT DOCUMENTS

| | | | |
|---|---|---|---|
| 8,711,003 B2 * | 4/2014 | Yu | B60W 40/09 340/459 |
| 9,047,722 B2 | 6/2015 | Kurnik et al. | |
| 2002/0007237 A1 * | 1/2002 | Phung | G05B 23/0216 701/31.4 |
| 2008/0161989 A1 * | 7/2008 | Breed | B60R 21/01532 701/31.4 |
| 2009/0271066 A1 * | 10/2009 | Underdal | G01M 17/00 701/33.4 |

(Continued)

FOREIGN PATENT DOCUMENTS

CN      103455026 A      12/2013

*Primary Examiner* — Yuri Kan
(74) *Attorney, Agent, or Firm* — Michael Spenner; Brooks Kushman P.C.

(57) ABSTRACT

A system includes a processor configured to receive report of a vehicle part malfunction, along with vehicle travel history covering at least a predefined time period. The processor is also configured to obtain condition data relating to environmental conditions encountered by the vehicle during the travel history. The processor is further configured to compare the obtained condition data to other condition data obtained from other vehicles reporting the same part malfunction. And the processor is configured to create a malfunction likelihood record for the vehicle part, including an association with a condition occurring over a threshold percentage of times with regards to all obtained condition data relating to the part malfunction and an indicator of a likely failure when a vehicle encounters the condition.

16 Claims, 3 Drawing Sheets

(56) References Cited

U.S. PATENT DOCUMENTS

| | | | |
|---|---|---|---|
| 2012/0296567 A1* | 11/2012 | Breed | G01C 21/26 |
| | | | 701/468 |
| 2015/0298684 A1 | 10/2015 | Schwartz et al. | |
| 2016/0140776 A1 | 5/2016 | Ricci | |
| 2016/0163130 A1 | 6/2016 | Zagajac et al. | |
| 2016/0284212 A1* | 9/2016 | Tatourian | G08G 1/0133 |
| 2018/0068320 A1* | 3/2018 | Yamada | G06Q 30/014 |
| 2018/0222309 A1* | 8/2018 | Follen | B60W 20/30 |

* cited by examiner

METHOD AND APPARATUS FOR STATISTICAL VEHICLE ELEMENT FAILURE ANALYSIS

TECHNICAL FIELD

The illustrative embodiments generally relate to methods and apparatuses for statistical vehicle element failure analysis.

BACKGROUND

Vehicles travel on all types of terrain in all types of weather. What effect the terrain and weather has on a vehicle is wildly varied, and different driving environments may impact completely different vehicle elements (e.g., without limitation, components/parts, systems, finishes, fluids, etc.). For example, a vehicle driving in high heat and dry conditions may experience wear to rubberized components in a manner different from a vehicle driving in a more moderate climate. A vehicle driving frequently on rough terrain may experience faster wear to shocks and tires. A vehicle driving in significant precipitation and/or humidity may experience faster deterioration of ferrous components.

Dealers in a particular area may generally recognize the preceding information (i.e., a dealer in Las Vegas, Nev., which is essentially a desert, may stock more parts that are prone to wear/replacement due to dry, high heat conditions). Typically, though, this "planning" represents a rough-guess based on past observation and/or generally known scientific facts about environment interaction with certain materials. Knowing that dry heat deteriorates rubber, however, provides a very limited opportunity to effectively plan for customer needs. There is a wealth of comprehensive and more detailed information still needed to make any form of reasonably accurate predictive needs assessment.

At the same time, customers are even less prone to predicting faults or failures, often waiting to have a part replaced or repaired until the deterioration or malfunction rises to a level that causes additional cost and problems.

SUMMARY

In a first illustrative embodiment, a system includes a processor configured to receive report of a vehicle part malfunction, along with vehicle travel history covering at least a predefined time period. The processor is also configured to obtain condition data relating to environmental conditions encountered by the vehicle during the travel history. The processor is further configured to compare the obtained condition data to other condition data obtained from other vehicles reporting the same part malfunction. And the processor is configured to create a malfunction likelihood record for the vehicle part, including an association with a condition occurring over a threshold percentage of times with regards to all obtained condition data relating to the part malfunction and an indicator of a likely failure when a vehicle encounters the condition.

In a second illustrative embodiment, a system includes a processor configured to receive report of a vehicle part malfunction, along with vehicle travel history covering at least a predefined time period. The processor is also configured to compare the obtained travel history to travel history obtained from other vehicles reporting the same part malfunction and create a malfunction likelihood record for the vehicle part, including a geographic association with a predefined locality in which over a threshold percentage of malfunction-reporting vehicles traveled.

In a third illustrative embodiment, a system includes a processor configured to aggregate received data for a plurality of vehicles traveling in a locality, the data indicating varied likelihoods of part malfunction for the vehicles including a particular part, based on saved malfunction records for the particular part indicating likelihood of part failure based at least on travel in the locality. The processor is also configured to extrapolate a likely total number of parts needed to service the vehicles based on the likelihood of malfunction and report a percentage of the likely total number of parts as suggested inventory to a service location associated with either the locality or at least one of the vehicles.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
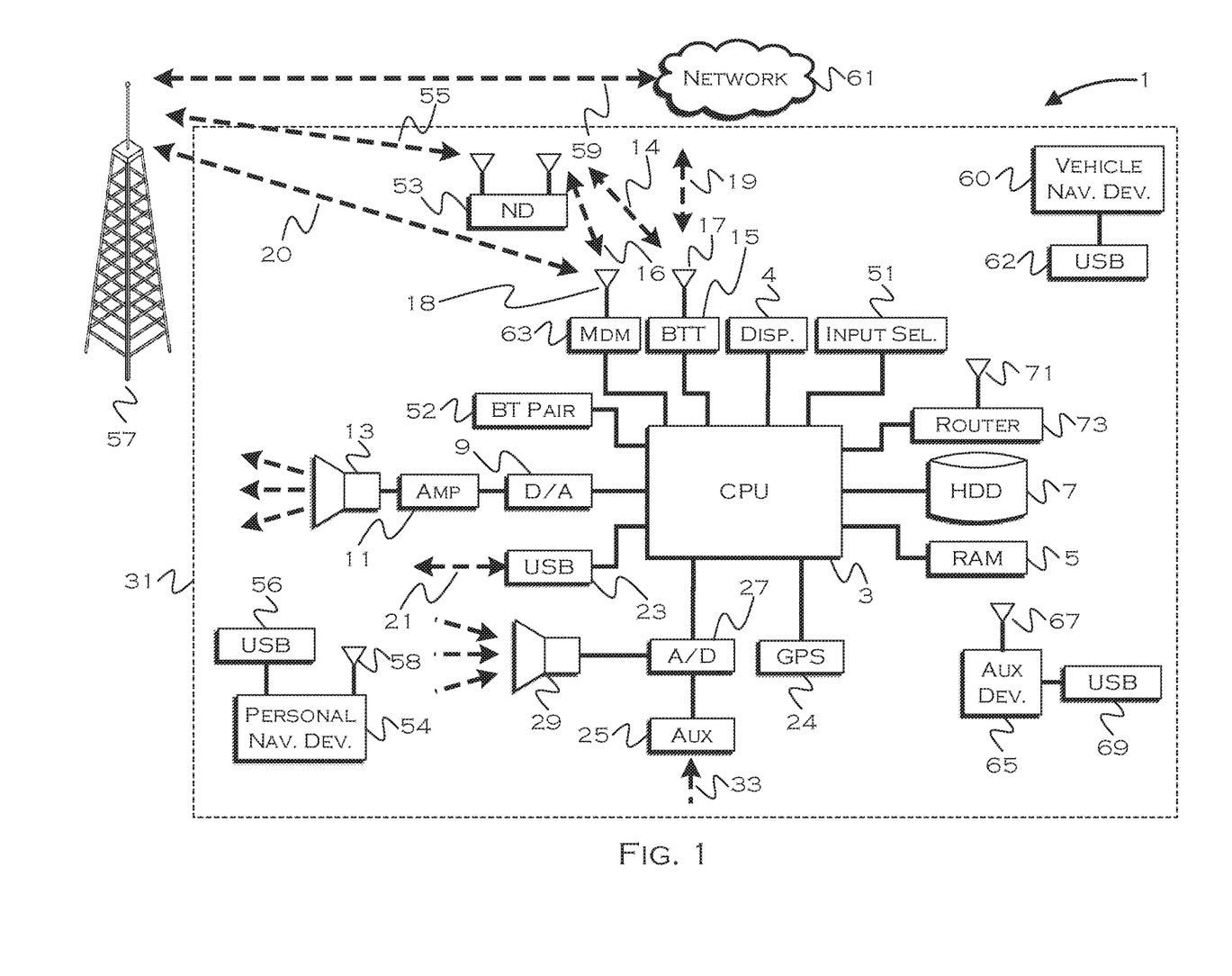
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Environmental conditions may significantly impact the performance of the certain vehicle component. For instance, an air filter will be more prone to clogging in areas susceptible to desert storms. An EVAP monitor may lead to false detection in areas with high altitude. Identifying areas that leads to component degradation could be used to prolong vehicle life as well provide necessary repairs.

Areas that have an observed specific effect on vehicle components, which can be determined at least in part through actual repair and component degradation gathered with respect to vehicles traveling heavily or frequently in those same areas, can be tagged as areas of concern for a particular component and/or vehicle. As a driver frequently travels through those areas, the likelihood of the driver experiencing a premature or unexpected need for repair may increase. By using historical and crowdsourced data, a comprehensive data set and analysis can be developed, that allows a system to predict, with a reasonable degree of accuracy, the likelihood of a customer experiencing a repair need.

The same information may be even more useful to dealers and service centers. For example, it may be useful to a customer to know that there is a 50% chance (based on observed likelihood of deterioration or malfunction in an area and/or that customer's travel frequency in the same area) that a belt will fail. This is useful to set customer expectations, and perhaps when the likelihood rises above a threshold (e.g., without limitation, 80%), the customer will head in for a replacement before actual failure.

At the same time, a data gathering and analysis system may inform a dealer that there are 78 potential customers in a predefined locale or in a predefined proximity to a dealer, and each customer has a 50% chance of belt failure. This can help a dealer pre-emptively order parts or keep a certain minimum number of parts in stock, to ensure fast service for customers.

Since there is often more than one dealer in a given area, additional gathered data may be useful to determine whether or not a customer will be likely to take a vehicle to a dealer for repair. This data can be tracked with respect to a vehicle and/or a particular customer profile. By cross-referencing this data along with the likelihood of failure data, the system may be able to predict a reasonable expectation for how many parts a dealer should keep in stock. The system can use actual observed correspondence (based on real behavior) to predicted visits and part needs to fine-tune predictions.

Once the analysis system has gathered and analyzed enough data to make a reliable prediction about an effect a condition has on a part, the system can geo-tag or geo-fence areas having that corresponding condition. Some conditions are transient (such as traffic or weather), while other conditions are persistent (such as rough, off-road terrain, minimum temperatures, etc). The system can accommodate for both, moving the transient conditions as they move, and/or enabling/disabling flags relating to those conditions based on current actual conditions (obtained from vehicles, a weather or road report, etc.).

Actual malfunctions associated with each condition may also be geo-tagged with a set of coordinates corresponding to a particular condition. This can be useful for vehicle-side analysis, where the vehicle can request coordinate sets for a particular configuration, the coordinate sets corresponding to an input route or common areas of travel. In other examples, a much broader coordinate set can be provided to the vehicle.

A vehicle can also track correspondence to failure situations with regards to how long a particular part or system has been exposed to a deleterious condition. For example, a vehicle may receive information indicating that under certain heat and humidity conditions, a belt has a 20% likelihood of failure after 2000 hours of exposure, a 40% likelihood of failure after 3500 hours of exposure, and a 75% percent likelihood of failure after 6000 hours of exposure (these numbers being illustrative and hypothetical for the sake of the example provided). If a vehicle has currently only traveled (or been parked/stored) in areas corresponding to the identified condition for less than 500 hours, the system may elect to take no action, since failure is unlikely. In another instance, however, a person may indicate that they wish to avoid component-deteriorating conditions as much as possible, so the vehicle may determine coordinate sets (and/or geo-fences) for each deteriorating condition and recommend a route or parking location accordingly. In still another example, the vehicle may take a least-cost avoidance approach, considering a variety of variables to determine a whole cost-effective approach for a customer.

For example, if a belt costs $30, and travel under a current planned route will increase the likelihood of failure by 0.001%, the expected cost to the customer is $0.03. At this cost, almost any detour using any additional fuel is more costly. But, if a component that cost $3500 were to experience a likelihood of failure increase of 1% based on a planned route, the expected cost would rise to $35, so a customer might prefer to use some amount of additional time and/or fuel to route around some or all of the deteriorating condition. Even in the belt example, the customer may consider their time to be highly valuable, and so the expected cost of the belt may be more in the neighborhood of $500, when the time and hassle of traveling to a dealer or service center for a replacement is considered. Customers and/or manufacturers can set and tune thresholds for the system to determine when a route-around is appropriate.

In contrasting examples, customers may consider that timeliness is the most important variable, and in those cases the system may forego routing around deleterious conditions. For those customers, the system may be useful in that it can anticipate a needed low-cost repair, which can save both time and money before a part breaks and causes a higher cost problem. Any suitable tuning and prediction/avoidance thresholds may be employed, based on customer or manufacturer desired outcomes.

Figure 2:
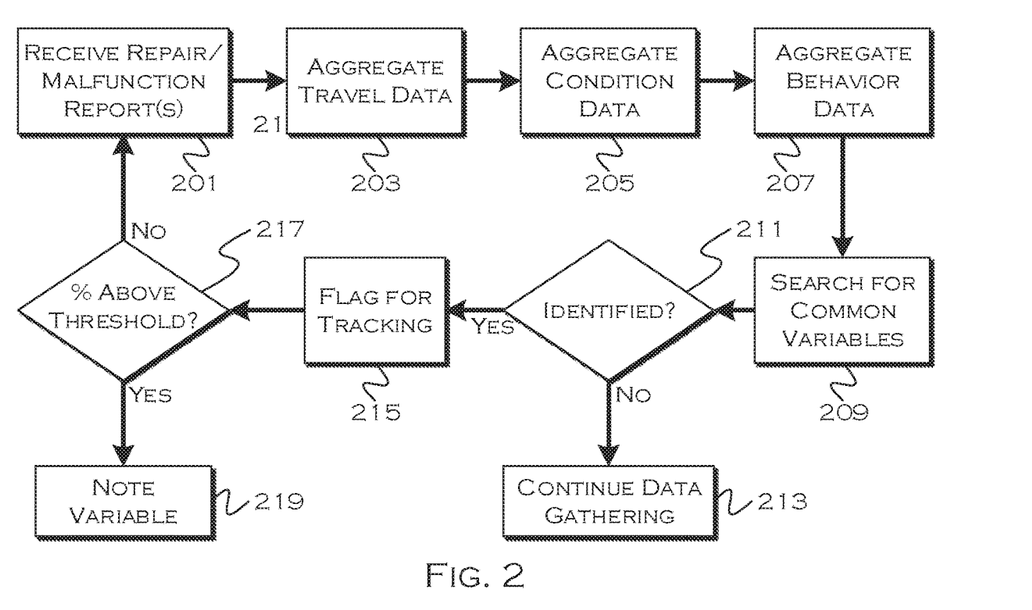
FIG. 2 shows an illustrative process for malfunction and condition data gathering.

FIG. 2 shows an illustrative process for malfunction and condition data gathering. In this example, the process receives a repair or malfunction report from a vehicle diagnostic unit and/or a dealer or mechanic maintenance system 201. Since this is actual data of a malfunction, the system can use this data to attempt to pinpoint a cause or multiple possible causes of the particular malfunction. Also, in this example, the vehicle has been tracking travel (at least coordinates) data. The analytics system aggregates this travel data (which can include parking data) 203. If a vehicle gathers comprehensive data, the vehicle may actually have gathered weather (precipitation, humidity, temperature, etc) 205 data and/or traffic data, and the analytics system may receive this data along with the travel data. In other examples, the travel data can be cross referenced with known environmental, travel and weather conditions (which can be looked up or reported by other vehicles over time) to establish a condition map of a given route. The system may also receive driver behavior data 207, which the vehicle can record and report. This can include a general profile (such as "cautious" or "aggressive") or a more detailed report including acceleration habits, stopping habits, etc.

The system can then analyze all of the preceding data, and any other data relevant for determining what may have caused the reported failure, against other vehicles having one or more common travel variables and experiencing the same failure. Through analysis of a large data set, the process can determine common variable sets as condition identifiers, and then can gradually determine which actual values for those conditions most closely correlate to failure. In a similar manner, the system can fine-tune the values for condition-failure correlation over time, so that predictions the system makes can demonstrate an increasing degree of accuracy.

If the comparison identifies one or more common variables 211, the process can flag the particular variables for more detailed tracking 215. This step is not necessary, but may assist with fine tuning data. For example, if temperature appears to have a high correspondence to the reported malfunction, the system may request that vehicles (at least those commonly traveling in certain areas) more frequently record local temperature, so that a more accurate map of temperature can be obtained. If any of those vehicles then experience a similar failure, the system can received the more detailed information relating to the identified variables. If there are no particular common variables of interest, the process can continue data gathering 213.

In this example, the process takes an additional step after flagging the variable of determining whether or not a percentage of incidences of values associated with the common variable(s) is/are above a threshold aggregate 217. That is, if the vehicles have a common variable of "low humidity," (based on a predefined value, for example) but only 5% of the considered sample size shares this variable value, low humidity may be identified as a potential common variable, but there may be insufficient data to identify it as a cause of the problem. In these cases, the system may continue to track the common variable (here, low humidity or humidity in general) more closely, to determine if future reporting can identify a better correlation. In cases where the system identifies more than a predefined threshold percentage of occurrences, the system may note the variable 219.

When the system reports data to vehicles for tracking, the system may report variable considerations above the threshold, for example. This allows the vehicle to better determine if a condition (corresponding to the variable) the vehicle is experiencing has a noted, relevant impact on one or more vehicle components.

To determine a likelihood of failure, it may also be useful to know general statistical information about a wider fleet of vehicles encountering a particular condition. Accordingly, vehicles can generally report travel data (such as GPS coordinates) and/or condition data, so the system can compare failure instances to non-failure instances to derive a percentage likelihood of failure. With sufficient data regarding a condition or location, this could be a fairly specific prediction, tuned based on factors such as operating hours under a condition.

With regards to a locality, it may be the case that vehicles simply report travel data when a condition is detected (and/or over a period of time, for baseline purposes). Some extrapolation can be made from averaging data obtained in snapshots (e.g., 20 vehicles a day average, for a week, as reported, may mean that data is useful for long term projections of volume). Long term data gathering can refine these numbers.

If a threshold number of vehicles traveling in a locality report a problem, this can be used as a basis for an assumption that traveling in the locality results in the reported problem. The boundaries of the locality can be defined, for example, as areas where correlation between problem-reporting vehicles diminishes (e.g., many vehicles may report being at various coordinates within a city, but those vehicles will likely have dissimilar exit patterns, so the overlap of coordinates will fall roughly within the boundaries of a city). In another example, the locality may be bounded by defined boundaries, such that sufficient reporting within the boundaries is enough to designate the entire area represented by the boundaries.

Timestamps associated with reported malfunctions can be used to bound a temporal snapshot for obtaining a baseline. During the time between when a first and last malfunction in a locality was reported, a total number of vehicles traveling in that locality can be estimated (or obtained through comprehensive reporting). If only one manufacturer receives data from their own vehicles, that data will at least be useful for considering malfunction likelihood with respect to that manufacturer's own vehicles and parts. The number of malfunctions can be compared to the number of vehicles to obtain a likelihood of malfunction. Iterations of this data, based on operating time, can be used to further refine the predictions (e.g., only vehicles with more than X hours of operation in the locality could be considered).

Figure 3:
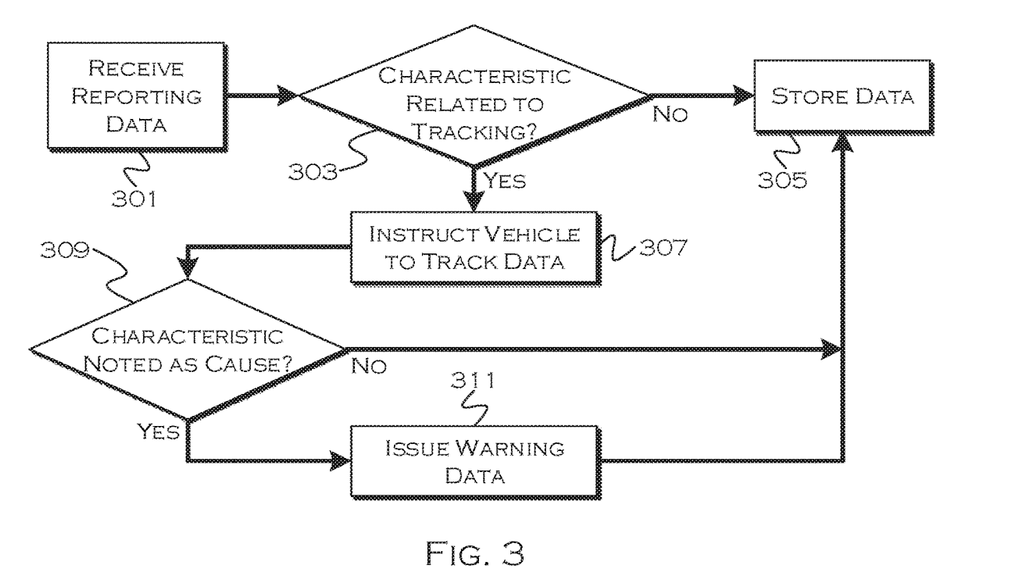
FIG. 3 shows an illustrative process for updating tracking variables.

FIG. 3 shows an illustrative process for updating tracking variables. In this particular example, a vehicle system with tracking capability and varied degrees of granularity is discussed. The vehicle receives metrics/variables from the remote system that the vehicle is to track 301. In this example, the vehicle may receive an entire data set defining part and variable relationships (e.g., without limitation–belt=increased chance of failure below 30% humidity, etc.). Additional relationships, such as working hours under a particular condition may also be defined, for the purpose of determining the likelihood of component failure. If the vehicle has a particular component for which tracking is relevant 303, the vehicle may store data 307 at instructed intervals, which may be, for example, more regular than other non-specified data gathering. If the vehicle lacks the component and/or is not traveling in conditions to which any of the variables apply, the process may simply store the tracking data 305 until such time as the data is applicable. Even if a vehicle lacks a component, the vehicle may still be instructed to track certain data in areas or under conditions of interest, so that the back-end system can gather more granular data for other vehicles which do report an incident (but which may not provide sufficient environmental data).

If the vehicle, while tracking, has both a component of interest and experiences a condition noted as a threshold cause of failure 309, the process may issue a warning to a driver 311 (and to other interested parties, such as a dealer). The warning can also include the relevant data variables and likely cause/chance of failure, in case this information is additional useful to the driver/dealer/other party. A vehicle-related routing system may also use this warning data to determine if an alternate route to avoid potential damage or failure is reasonable, based on defined re-routing settings.

Figure 4:
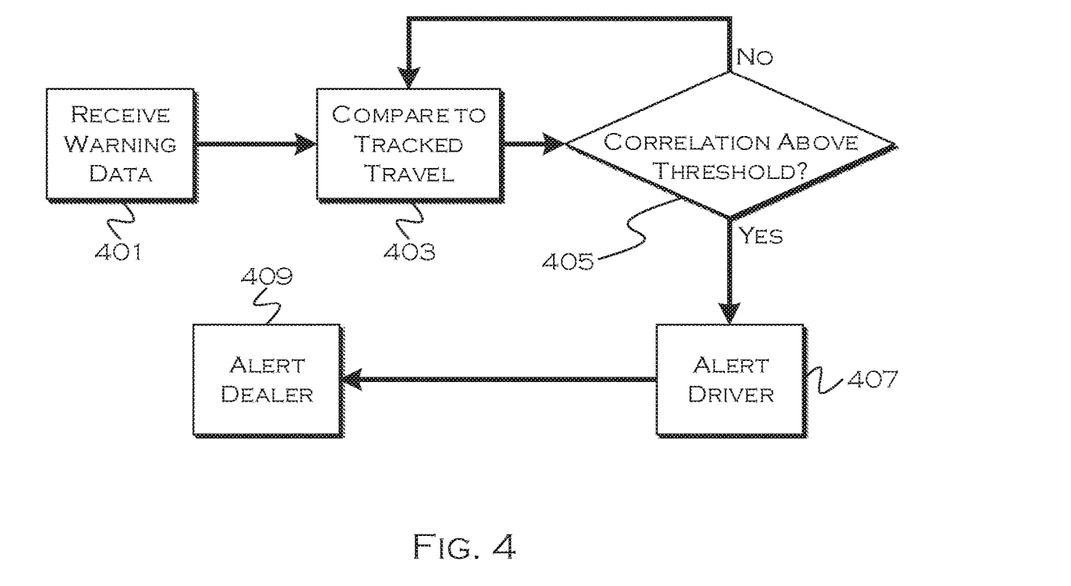
FIG. 4 shows an illustrative process for data analysis and customer reporting.

FIG. 4 shows an illustrative process for data analysis and customer reporting. In this example, the process receives the warning data issued from the FIG. 3 threshold analysis, indicating that a vehicle both contains a failure-candidate component and that conditions for possible failure have been met. The vehicle can compare the requirements for expected failure (e.g., travel time under the failure-associated conditions), looking at past, recorded travel, current conditions and expected upcoming conditions. If there is a correlation between travel conditions and an expected degree of failure that is designated to merit reporting 405, the process may alert both the driver 407 and an associated dealer 409. The "associated dealer" may be a vehicle-associated dealer (the dealer who sold the vehicle), or a driver identified preferred dealer or service center. In other examples, the report may also be sent to dealers in a local region and/or a driver identified home-region. Based on comparison of a likelihood of failure and a likelihood of a driver using a particular dealer (which can be known to some extent based on observed behavior), each and any dealer can make an assessment as to the likely need for a part. Aggregating all of these assessments will allow the dealer to predict likely part need.

For example, a driver may receive a warning that a tire will likely fail with a 20% threshold. This warning may be issued to local tire dealers and to a driver-preferred service location. Drivers may (based on observed history) have tires fixed wherever the blow-out occurs with 95% frequency and at a preferred dealer with a 5% frequency. There may also be 10 tire-repair stores that are local to the driver location, which all receive the notification. Drivers may also be observed to address tire potential issues with 35% frequency at a 20% likelihood of failure (i.e., perform preventative replacement). In those cases, drivers may be observed to address the issue at a preferred location 80% of the time and at a local tire dealer 20% of the time.

While all of the above is provided only for the sake of example, the following equations loosely and broadly show how a dealer or service center can anticipate inventory needs.

Dealer=(0.2 (blowout)*0.05 (driver goes to dealer))
*0.65 (driver waits for blowout)+0.35 (preventative maintenance)*0.8 (dealer)=28.7%

Local center=(0.2 (blowout)*0.95 (driver goes local))*0.65 (waits for blowout)+0.35

(maintenance)*0.2 (local)=19.3%

No action needed=0.8 (no blowout)*0.65 (waits for blowout)=52%

While the above data may not be extremely useful when considering a single vehicle, if reporting of the above data for 1000 vehicles occurred in a day, the dealer would expect to need 287 tires (this assumes that all 1000 vehicles are from the exact same dealer) and each of the 10 local centers would expect to need 19 tires (193/10). Recording data of actual observed occurrences may allow for more fine tuning of the above data, but this broad example shows the relevance of the types of determinations discussed herein. As the data can be refined with better correlation to variables and observed behavior, the number of projected needed tires should begin to closely approach the number of actual needed tires.

Driver response can also be used as feedback to determine reporting thresholds. For example, in the above example, if 35% of drivers respond with maintenance when a 20% chance of blowout is reported, this may be a sufficient threshold to continue reporting. If the number were, for example, below 5% and stayed that way until the likelihood of blowout crossed 50%, at which point the number taking maintenance action spiked, the process may instead elect to report warnings to drivers at the 50% mark. Dealers/centers could still receive the data regardless, since they may employ back-end management systems and are less prone to annoyance from over-reporting than drivers may be. Of course, data of even a 1% chance (or less) of incident can be reported to drivers if desired.

Figure 5:
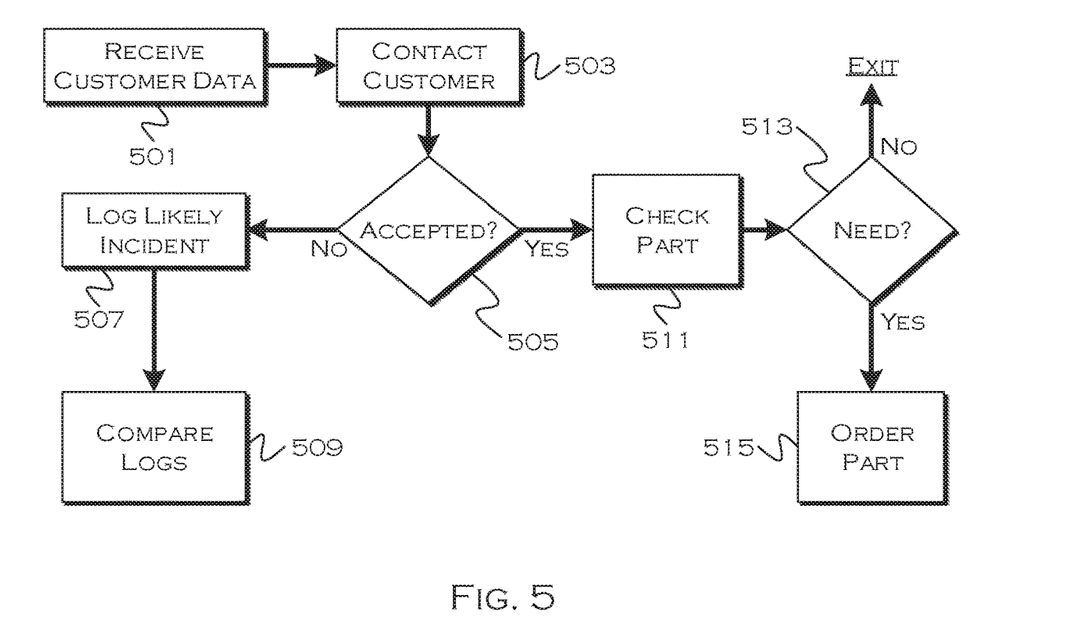
FIG. 5 shows an illustrative process for dealer reporting.

FIG. 5 shows an illustrative process for dealer reporting. In this example, the process receives customer data, such as that described above 501. For example, the process can receive an identification of likely-failing parts, a chance of failure and any relevant customer information. The process may elect to send a notification to the customer in this example 503, which could include an offer for service and, for example, a coupon. In some instances, whether or not the customer is contacted can depend on the customer's observed reception to previous such contacts and/or the actual likelihood of failure. Another factor the process could consider would be the cost of later repair vs. maintenance repair (e.g. the cost of replacing a tire may be the same, although a blowout may involve a tow and time in addition, or, e.g., the cost of replacing an engine component may be low, but the cost of replacing a much more expensive component may be expected if the first component fails—the notification may be sent at a lower likelihood threshold with regards to the second example, in order to avoid a high-cost repair).

In this example, the customer can elect to accept the offer for service 505, and if the customer accepts the offer, the dealer knows that the part is needed with a much higher likelihood 511, since the variable about where the customer will seek maintenance rises to approximately 100%. Whether or not the part will actually need to be replaced may still be in question (since the recommendation was based on statistical analysis), but the dealer has a higher expectation of need. Based on inventory 511 vs. need 513, the dealer system can determine if the part should be automatically ordered 515.

If the customer does not accept the maintenance recommendation 505, the process can log the reported possibility of incident 507. A backend or local system can compare this data to when an incident is actually reported for the part on the relevant vehicle 509 (VIN or customer data could be saved with the initial log). The comparison helps refine the data, and may demonstrate that a projected failure rate is lower or higher than expected.

A backend system can save both condition data and part data with associated geo-tags. For example, condition data can have geo-tags associated therewith, and the system can associate particular relevant conditions with a particular part number. If a vehicle has a part of the number or type, the vehicle can request the relevant condition data and or areas of geographic concern for that part.

In another example, it may not be possible to identify with specificity the particular environmental aspects of a locale that cause part degradation. But it may be observed that all vehicles in a certain region consistently experience certain part failure at a certain rate after a certain number of operating hours. In this case, the "variable" would be, for example, amount of time spent in the identified locale, which would be the variable tracked by the vehicle. This operating data could be used to determine the likelihood of part failure, without any specific reference to the actual physical conditions that may be the root cause of the failure. Vehicles of concern (having parts with a threshold likelihood of failure) could either avoid the area or at least analyze the cost of avoidance vs. the cost of continued operation in the area.

Through the illustrative embodiments, comprehensive geographic coordinates and conditions can be related to part failure, and this data can be used to inform both customers and dealers of expected issues.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
   a processor configured to:
   receive report of a vehicle part malfunction, along with vehicle travel history covering at least a predefined time period, prior to the malfunction;
   obtain condition data relating to environmental conditions encountered by the vehicle during the travel history based on vehicle locations indicated in the travel history compared to identifiable environmental conditions associated with the locations at the time the vehicle was at those locations, the time also indicated in the travel history;
   compare the obtained condition data to other condition data obtained from other vehicles reporting the same part malfunction; and
   create a malfunction likelihood record for the vehicle part, including an association with a condition occurring over a threshold percentage of times with regards to all obtained condition data relating to the part malfunction and an indicator of a likely failure when a vehicle encounters the condition.

2. The system of claim 1, where the vehicle travel history includes vehicle GPS coordinate sets.

3. The system of claim 1, wherein the environmental conditions include temperature.

4. The system of claim 1, wherein the environmental conditions include weather.

5. The system of claim 1, wherein the environmental conditions include road conditions.

6. The system of claim 1, wherein the environmental conditions include traffic conditions.

7. The system of claim 1, wherein the indicator of likely failure is based on a comparison of vehicles experiencing both failure and the condition to vehicles experiencing the condition and not the failure.

8. The system of claim 7, wherein the condition data includes hours of operation under the condition, and wherein the indicator of likely failure is stored in a manner that reflects different values for different numbers of operating hours.

9. A system comprising:
   a processor configured to:
   receive report of a vehicle part malfunction, along with vehicle travel history covering at least a predefined time period;
   compare the received travel history to travel history obtained from other vehicles reporting the same part malfunction; and
   create a malfunction likelihood record for the vehicle part, including a geographic association with predefined locality in which over a threshold percentage of malfunction-reporting vehicles traveled.

10. The system of claim 9, wherein the geographic association includes one or more sets of GPS coordinates defining the locality.

11. The system of claim 9, wherein the geographic association includes a predefined locality having a government-defined border.

12. The system of claim 9, wherein the malfunction likelihood record includes a likelihood of failure based on a total volume of vehicles projected to travel within the locality, over a time period during huh a first and last malfunction was reported.

13. The system of claim 9, wherein the malfunction likelihood record includes an operating-hours designation, defining varied operating hour ranges and likelihoods of failure associated with those operating hour ranges, determined based on vehicles reporting travel in the locality for a number of hours within a respective range.

14. The system of claim 9, wherein the processor is further configured to report the malfunction likelihood record to a vehicle that includes the predefined locality on a planned route.

15. The system of claim 9, wherein the processor is further configured to report the malfunction likelihood record to vehicles operating within the predefined locality.

16. The system of claim 9, wherein the processor is further configured to report the malfunction likelihood record to vehicles having the vehicle part.

* * * * *